United States Patent
Yi et al.

(10) Patent No.: US 8,838,895 B2
(45) Date of Patent: Sep. 16, 2014

(54) SOLID-STATE DISK CACHING THE TOP-K HARD-DISK BLOCKS SELECTED AS A FUNCTION OF ACCESS FREQUENCY AND A LOGARITHMIC SYSTEM TIME

(75) Inventors: Letian Yi, Beijing (CN); Chong (Ethan) Hao, Beijing (CN); Zaide Liu, Santa Clara, CA (US)

(73) Assignee: 21ViaNet Group, Inc., Beijing (CN)

( * ) Notice: Subject to any disclaimer, the term of this patent is extended or adjusted under 35 U.S.C. 154(b) by 657 days.

(21) Appl. No.: 13/157,289

(22) Filed: Jun. 9, 2011

(65) Prior Publication Data

US 2012/0317338 A1 Dec. 13, 2012

(51) Int. Cl.
*G06F 12/08* (2006.01)
(52) U.S. Cl.
CPC ............................ *G06F 12/0868* (2013.01)
USPC .................. 711/117; 711/103; 711/E12.002; 711/E12.008

(58) Field of Classification Search
None
See application file for complete search history.

(56) References Cited

U.S. PATENT DOCUMENTS

| 8,156,288 | B2 * | 4/2012 | Karamcheti et al. | .......... 711/146 |
| 8,315,995 | B1 * | 11/2012 | Levy | .............. 707/694 |
| 8,407,417 | B2 * | 3/2013 | Matsuda et al. | .............. 711/114 |
| 2010/0199036 | A1 * | 8/2010 | Siewert et al. | ................. 711/112 |
| 2010/0293337 | A1 * | 11/2010 | Murphy et al. | ................ 711/136 |
| 2012/0246386 | A1 * | 9/2012 | Akutsu et al. | .................. 711/103 |

OTHER PUBLICATIONS

Douglas Comer. 1979. Ubiquitous B-Tree. ACM Comput. Surv. 11, (Jun. 2, 1979), 121-137.*

* cited by examiner

*Primary Examiner* — Edward Dudek, Jr.
*Assistant Examiner* — Ralph A Verderamo, III
(74) *Attorney, Agent, or Firm* — Stuart T. Auvinen; gPatent LLC

(57) ABSTRACT

A solid state disk (SSD) caches disk-based volumes in a heterogeneous storage system, improving the overall storage-system performance. The hottest data blocks are identified based on two factors: the frequency of access, and temporal locality. Temporal locality is computed using a logarithmic system time. IO latency is reduced by migrating these hottest data blocks from hard-disk-based volumes to the solid-state flash-memory disks. Some dedicated mapping metadata and a novel top-K B-tree structure are used to index the blocks. Data blocks are ranked by awarding a higher current value for recent accesses, but also by the frequency of accesses. A non-trivial value for accesses in the past is retained by accumulating the two factors over many time spans expressed as a logarithmic system time. Having two factors, access frequency and the logarithmic system time, provides for a more balanced caching system.

15 Claims, 5 Drawing Sheets

SSD mapping metadata

| SSD physical Number (302) | Logic block number (304) | Status (306) |
|---|---|---|
| 1 | 2012 | clean |
| 2 | 2045 | clean |
| 3 | 4325 | dirty |
| 4 | 7788 | dirty |
| ... | ... | ... |
| K | 0 | NULL |

318 — Volume mapping metadata

| Logic block number (312) | SSD Number (314) |
|---|---|
| 2012 | 1 |
| 2045 | 2 |
| 4325 | 3 |
| 7788 | 4 |
| ... | ... |
| 0 | 0 |

SOLID-STATE DISK CACHING THE TOP-K HARD-DISK BLOCKS SELECTED AS A FUNCTION OF ACCESS FREQUENCY AND A LOGARITHMIC SYSTEM TIME

FIELD OF THE INVENTION

This invention relates to flash memory systems, and more particularly to caching data to boost the performance of the IO subsystems, based on frequency and temporal locality.

BACKGROUND OF THE INVENTION

Over the past decade, the use of flash memory has evolved from specialized applications in hand-held devices to the primary system storage in general-purpose computers. Recently, there has been significant interest in using flash-memory storage to run primary file systems for personal computers as well as file servers in data centers.

Flash memory includes of an array of individual cells, each of which is constructed from a single floating-gate transistor. Single Level Cell (SLC) flash stores a single bit per cell and is typically more robust; Multi-Level Cell (MLC) flash offers higher density and therefore lower cost per bit.

Both SLC and MLC flash support three operations: read, write (or program), and erase. In order to change the value stored in a flash cell it is necessary to perform an erase before writing new data. Read and write operations typically take tens of microseconds. Although the erase operation may take more than a millisecond, compared with magnetic disk drives, flash can substantially improve reliability and random I/O performance.

With these desirable properties of flash memories, the emergence of flash-based solid-state drives (SSDs) has the potential to mitigate I/O penalties in current systems. For example, flash-based Solid State Devices (SSDs) provide thousands of low-latency I/O Operations Per Second (TOPS) and are not affected by seeks. Additionally, recent SSDs provide peak throughput that is significantly superior to magnetic hard disk drives (HDD).

To support traditional layers of abstractions for backward compatibility, some development work on SSDs has focused on building firmware and software. For example, recently proposed techniques such as the Flash Translation Layer (FTL) are typically implemented in a solid-state disk controller with a disk drive abstraction. System software then uses a traditional block storage interface to support file systems and database systems. This compatibility therefore improves the likelihood of using SSDs in computer systems.

However, although SSD capacity continues to increase, there is no indication that the current high cost per GB for SSDs will soon approach the much lower cost of magnetic disks. As a result, I/O hierarchies often include both HDDs and SSDs, and it is important to examine techniques that can increase SSD cost-efficiency. To optimize cost-efficiency, a heterogeneous system should determine the data popularity and then migrate the hottest data from the slower HDDs into the SSDs. However, migration is not cost-free. This is because additional internal IO requests for migration are queued in the disk drive, resulting more front-end latency.

Therefore, when integrating both SSD and HDDs in the heterogeneous storage system, a key systems design question is how to build the framework of modules that are integrated together, such as how to identify the hottest blocks in the HDD array and how to migrate them to the SSD to boost IO performance. Also, the system stack for a heterogeneous storage system has the traditional HDD file system with a cache stored in the SSDs. As a result, creating an efficient system stack with good performance is also a challenge.

What is desired is a heterogeneous storage system with a SSD cache for HDDs. A heterogeneous storage system with an intelligent caching algorithm is desired. A heterogeneous storage system that chooses the hottest data for caching is desirable to improve performance. Selecting blocks for caching based on two factors rather than just a single factor is desired to improve cache performance.

BRIEF DESCRIPTION OF THE DRAWINGS

FIG. 3A illustrates a layout of the SSD mapping metadata for describing the usage status of SSD.

FIG. 3B illustrates the layout of the volume mapping metadata table.

DETAILED DESCRIPTION

The present invention relates to a performance improvement in flash-memory caches for volumes constructed by hard disks. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that an array of solid state disks, based on flash memory, has excellent random read and sequential write performance. The inventors realize that a SSD can be used as data cache to enhance the performance of hard disk based volumes.

The inventors further realize that HDD data with a higher temporal locality and a higher frequency of access can be chosen to be migrated into the SSD. The inventors realize that both access frequency and the time delay since the last access are important factors when selecting blocks that are considered "hot". The combination of the two factors can improve performance.

Figure 1A:
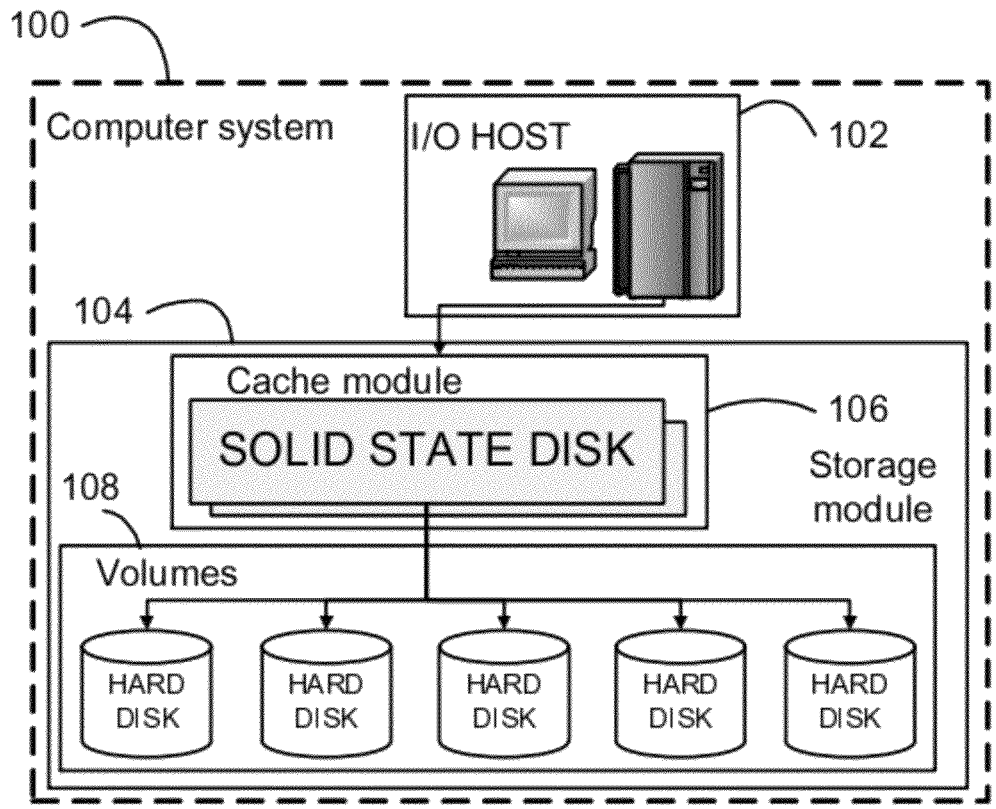
FIG. 1A is a block diagram of a computer system that includes both a hard disk drive HDD and an efficient SSD in the cache module.

FIG. 1A shows a computer system that provides both SSDs and HDDs. Computer system 100 includes one of various devices and systems such as personal computers (PCs), laptop computers, hand-held devices, and server computers. Computer system 100 is particularly configured to perform fast or efficient caching using SSDs as a cache storage device. It is contemplated that some implementations of computer system 100 may have one or more hard disk drives, which are managed as logic volumes. The SSD can be NAND flash memory or NOR flash memory organized as a block device, exporting the block interface to the upper layer of software or firmware.

Input/output (I/O) host 102 sends read and write data access requests to storage module 104. Storage module 104 includes cache module 106, with solid state disks, and volumes 108 that include hard disk drives. If the requests could be satisfied in the SSDs, cache module 106 determines the physical address in the SSD based on mapping information. Otherwise, the current request is sent to volumes 108. Volumes 108 may be configured as Redundant Array of Individual Disks (RAID) volumes, which protect from disk failure. Alternatively, volumes 108 may be configured as an individual partition.

Figure 1B:
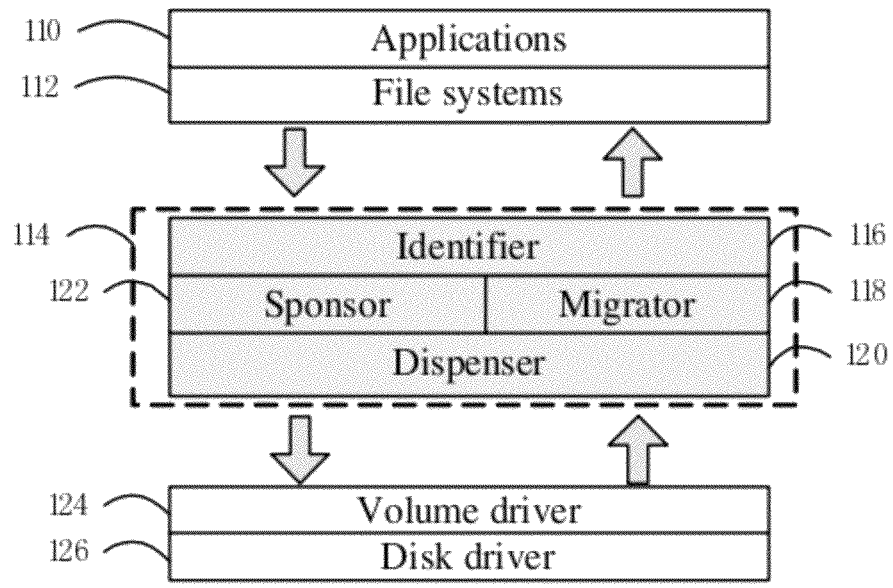
FIG. 1B illustrates the detailed software architecture of the computer system of FIG. 1A.

FIG. 1B illustrates the detailed software architecture of the computer system of FIG. 1A. All of these software modules typically reside in I/O host 102. Applications 110 running on I/O host 102 send file requests to file system 112, which reside in the operating system (OS). Through file system 112, applications 110 can access and manage files. File system 112 parses the file requests and translates them to IO requests which access logic block in volumes 108. According to the type of operating system installed in I/O host 102, file system 112 can be configured as any type of main streaming systems, such as EXT3 or XFS in the Linux operating systems and NTFS or FAT in the Windows operating system.

Identifier 116 in hybrid SSD/HDD interceptor module 114 tracks every IO request submitted by file system 112, maintaining a record of the popularity of every block in volume 108. Since the IO request may access several different logic blocks, identifier 116 traverses every logic block number referenced by the 10 request to record the access time and increase the access count for each logic block referenced. Identifier 116 identifies the hot data, which has been accessed recently and frequently, and the cold data, which has not been accessed in a long time.

Since the SSD is added to decrease the IO latency by caching the hottest data, if there are too many access misses from SSD, Sponsor 122 triggers the data migration between the SSD and the volumes, casting out the old cache data in the SSD and replacing it with hotter data from the HDD.

Sponsor 122 maintains the cache access miss information of IO requests. The cache miss information records both the time elapsed and access miss count from the last trigger. Once cache module 106 can not absorb and satisfy an adequate amount of IO operations, Sponsor 122 activates migrator 118 to migrate blocks to improve performance of the storage system.

Only if sponsor 122 finds that both the time elapsed from last trigger and the access miss count reach the preset threshold, sponsor 122 triggers migrator 118 to perform migration. However, the cache mechanism may not always be effective at increasing performance because of the migration cost under some applications. Therefore, sponsor 122 is allowed to stop triggering migrator 118 to migrate some specific blocks. Hit record 222 (FIG. 2A) records the hit count of a block in the time span in which the corresponding block resides in the SSD. Mignum 224 records the number of migrations performed on the corresponding block. Therefore, this disabling can be determined automatically, such as when the miss count continues to exceed the threshold despite a preset number of migrations. For example, if 5 migrations have been performed on a block, but each time the block is not hit and the miss count threshold is reached, that logical block can be disabled from further migrations. This can prevent thrashing.

Once the migration is triggered, migrator 118 replaces the cold data residing in the SSD with the current hottest data by reading the hottest data from volumes 108 and writing them into SSD. Dispenser 120 submits the IO request to the specific device driver based on volume mapping metadata 318 (FIG. 3B). If the requested data exists in the SSD, dispenser 120 redirects the IO request to SSD driver 126 to satisfy the data access requests of IO host 102. Otherwise, IO requests are satisfied by volume driver 124.

Figure 2A:
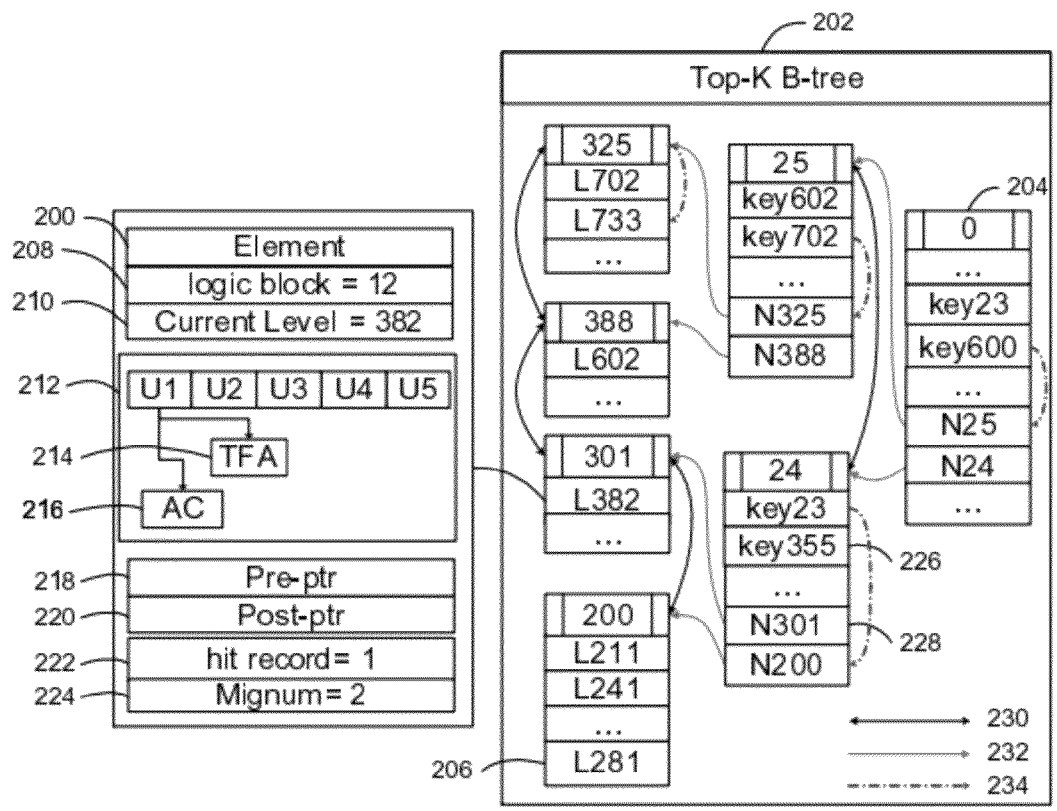
FIG. 2A illustrates maintenance of the hottest block index in the identifier using a top-K B-tree which is sorted by the current level of the block and presents the current K of the hottest logic blocks in runtime.
Figure 2B:
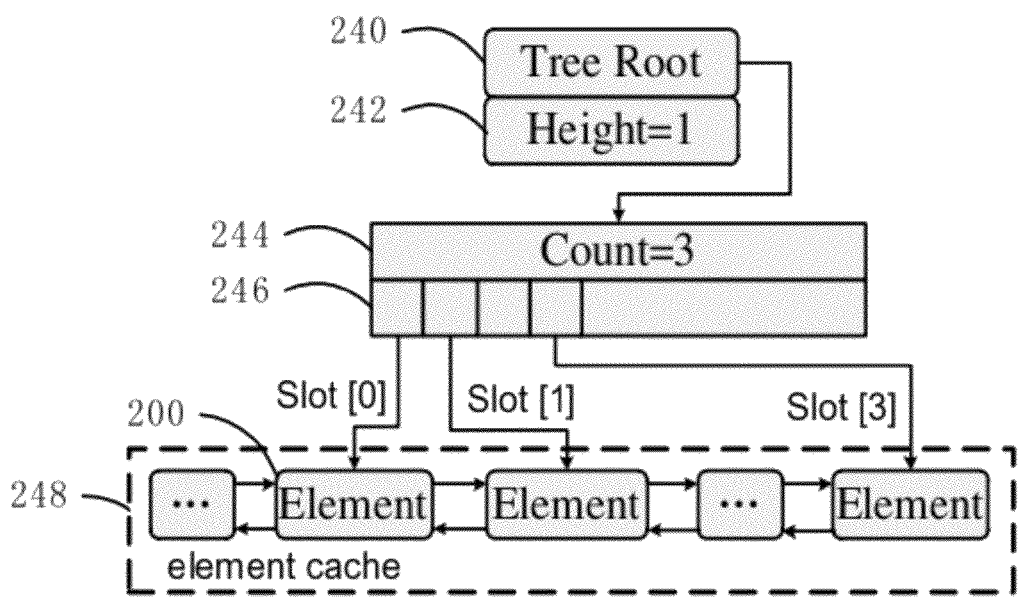
FIG. 2B shows the identifier using a radix tree to sort the elements in the B-tree, in an element cache.

FIG. 2A and FIG. 2B illustrate maintenance of the block index in identifier 116. Every element 200 in both figures corresponds to a logic block of the file system. Every element in the system is indexed by radix tree 240 in which the key is the logic block number. The elements of the hottest-K blocks are also indexed by dedicated Top-K B-tree 202, where K is a whole number and the key is the element's hot degree expressed by current level 210. Since the SSD size and the number of blocks residing in the SSD can vary, K is a variable determined by the SSD size divided by the logic block size of file system 112. Note that elements 200 indexed by Top-K B-tree 202 are always a subset of radix tree 240: if current level 210 of element 200 is one of the hottest K blocks, it is indexed by both Top-K B-tree 202 (FIG. 2A) and radix tree 240 (FIG. 2B).

To identify the hottest blocks, both temporal locality and frequency of access are considered. Time is split into time spans, such as 10 seconds in this example, and each time span corresponds to an individual member of Unit Array 212, expressed by a series of Ui in FIG. 2A. Every member of Unit Array 212 records both the Timestamp of the First Access (TFA) 214 and Access Count (AC) 216 in this time span. Access Count (AC) 216 is the number of accesses, regardless of the transfer size, from the host to that block during the time span, but could be the number of bytes or words accessed as an alternative. TFA 214 records the timestamp of the first access in the corresponding time span. Since TFA 214 also implies the start time of the corresponding time span, the temporal factor is actually stored in the Unit Array; also, AC 216 essentially indicates the factor of the frequency in the last time spans.

Before performing an IO request on a specific block, identifier 116 first determines which member of Unit Array 212 to update for the current request. Identifier 116 performs as follows: first, Identifier 116 computes the member number within Unit Array 212. The member number is determined as (current time—the initiated time)/10, where the initiated time is the time point of the HDD/SSD system loading (it is expressed as the wall-clock time). The time spans are 10 seconds in this example. The selected member in the array in this step is termed "the current member".

Second, identifier 116 decides whether the IO request should update Access Count (AC) 216 of the last member. Identifier 116 examines the number of the last valid member in Unit Array 212, that is (TFA 214 in the last valid member))—the initiated time)/10: if the number of the current member is equal to the last valid member number, identifier 116 increases Access Count (AC) 216 in the last valid member of Unit Array 212, otherwise, identifier 116 records the current timestamp (this stamp also indicates the timestamp of the current request) into the TFA 214 of a new member of Unit Array 212. Meanwhile, Access Count (AC) 216 of the new member is initiated at 1.

Once Unit Array 212 is full, identifier 116 computes a new current level based on the saved values in current level 210 and the state described in Unit Array 212. The block's current level 210 is initiated as 0 at the first access, indicating never accessed. To collect statistics about the states described by Unit Array 212, identifier 116 traverses Unit Array 212 and acquires both Timestamp of the First Access (TFA) 214 and Access Count (AC) 216 of every member.

Identifier 116 then uses the logarithmic system time, expressed by f(ti), to compute the temporal factor of the last 5 access requests. Every time value (ti) corresponds to a member of Unit Array 212 and may be computed as follows: (TFA 214 of the member—the initiated time)/length of a time span, where the length of a time span is in seconds (10 seconds in this example). An embodiment of f(ti) can be implemented as $\log_n(t_i)$, where n is larger than 1 and can be adjusted to adapt to applications 110. Thus f(ti) is a logarithm of time, or a logarithmic system time.

To factor in the access frequency, identifier 116 generates a multiplication result by multiplying Access Count (AC) 216 and the logarithmic system time f(ti) of the corresponding member in Unit Array 212. The sum result of every member's multiplication result is termed the "cumulative level value". Therefore, higher access counts in AC 216 produce a higher cumulative level value.

Identifier 116 then adds the newly generated cumulative level value into current level 210. Current level 210 is the old level value stored in element 200, which indicates the access history of this logical block. As a block remains hot, it's current value increases for each time span that it is accessed, as another new cumulative level value is added or accumulated into current level 210. On the other hand, newly-loaded blocks have not yet accumulated many time spans' of new cumulative level values and thus have a lower current level 210. Blocks that are not accessed for a long time or infrequently have stagnant current levels 210, and are eventually surpassed by hot blocks as their current levels 210 increase.

Unit Array 212 has a size of 5 in this example. To adapt to the application workload, the size of Unit Array 212 and the length of the time span can be adjusted by adjusting the configuration. For example, reducing the size of Unit Array 212 from 5 to 2 can cause a block to be swapped out from the SSD cache more rapidly. Note that although every individual member in Unit Array 212 indicates a continuous time span internally, because a particular block may not have been accessed in every time span, the time spans between two continuous members in the array can be nonadjacent.

The K elements in top-K B-tree 202 correspond to the K blocks with the highest current level 210. Top-K B-tree 202 is a dynamic B-tree whose elements are replaced during runtime. On every access, identifier 116 detects if the accessed block belongs to the top-K hottest blocks by checking if its current level 210 is greater than the minimum current level in top-K B-tree 202. If the current level of a new block is greater than the minimum current level in top-K B-tree 202, the new block is inserted into top-K B-tree 202 and marked for inclusion in the next round of migration from the HDD volume to SSD. Meanwhile, if the size of top-K B-tree 202 is already full before insertion, the old minimum element 200 is eliminated from the top-K B-tree 202 and marked for inclusion in the next round of migration from SSD to HDD volume. Therefore, top-K B-tree 202 preserves the K largest current levels of all accessed blocks. Current levels of blocks that are not in top-K B-tree 202 are stored in another device, such as in the HDD. Current levels are initially zero.

The current top-K B-tree 202 data uses a structure of dimension K, which stores the top-K ranked elements. The nature of the B-tree provides efficient operations for the hottest blocks, even when K is very large.

The right side of FIG. 2A illustrates an example of a Top-K B-tree. In the tree, every node 204 is assigned a node number. The root node is always node 0. The relations in the Top-K B-tree include the father-child relation, the pair relation, and the brotherhood relation, as shown by unidirectional solid line 232, unidirectional dotted line 234, and bidirectional solid line 230, respectively.

In the intermediate node, key 226 is always paired with child pointer 228 which points to the child node. Keys in the node are ordered from least to largest. Each tree node 204 ensures that the keys in its child nodes fall in the range [current key, next key], where the current key is the one paired with child pointer 228.

The leaf node keeps the address of the element in Top-K B-tree. For example, as shown in the FIG. 2A, in the root node, key 23 is paired with N24 and N25's next key is 600, therefore, the child node 24 keeps any key falling in the range [23, 600). The leaf node 301 maintains the element pointer which points to the left element. Note that this organization ensures that the element with the minimum current level is always stored in a leaf node which can be looked up using the minimum key in the root node, therefore, the time complexity is O(n), where n is the depth of the tree.

FIG. 2B is an example of radix tree 240 whose height 242 is 1. Every slot 246 of the leaf nodes from tree root 240 points to an element, and there are 3 elements 200 (count 224) in this example.

When the size of volumes 108 is very large, a huge mass of elements may introduce a huge memory cost to storage module 104. Therefore, element cache 248 is employed to limit the element number. Element cache 248 is built using a list which is sorted by current level 210 of every element 200. Every element 200 uses two pointers: pre-pointer 218 and post-pointer 220 to link the previous element 200 and the post element 200 respectively. The size of element cache 200 size is larger than the size of Top-K B-tree 202 and is variable in runtime. Periodically, identifier 116 examines the size of element cache 248. If storage module 104 is stressed by too large of a memory size of element cache 248, element cache 248 eliminates some elements 200 at its tail.

FIG. 3A illustrates a layout of the SSD mapping metadata for describing the usage status of SSD. For data durability, SSD mapping data 300 is stored in non-volatile memory. Alternatively, SSD mapping data 300 can be kept in the DRAM and flushed into SSD periodically. SSD mapping data 300 includes entries (shown as rows) and every entry corresponds to a logic block in SSD.

Since the entries should be sorted by physical block number 302 of the SSD, SSD mapping data 300 is implemented by an array whose size is K. Each entry also includes a field for logic block number 304 of volume 108. Status field 306 is used to keep the current status of corresponding entry. Status field 306 could be clean, which means the data of SSD physical block number 302 is identical to the data of logic block number 304 in volume 108, and dirty indicating they are different. If status 306 of the entry is NULL, this means the entry is still free space and can be allocated for a subsequent write request.

FIG. 3B illustrates the layout of the volume mapping metadata table. Volume mapping metadata 318 represents the mapping from volume 108 to the SSD address using an entry with logic block number 312 in volume 108 and physical block number 314 in the SSD. However, since dispenser 120 (FIG. 1B) queries if the currently requested block is in the SSD, the volume mapping metadata should be indexed effectively to avoid increasing the IO latency. Therefore, in one implementation the volume mapping metadata is organized using the tree structure, such as a radix tree or a B-tree where the key is logic block number 312. With SSD mapping data 300 and volume mapping metadata 310, the system cannot only check if the specific block exists in the SSD, but also determine the current status of the data residing in the SSD.

Figure 4:
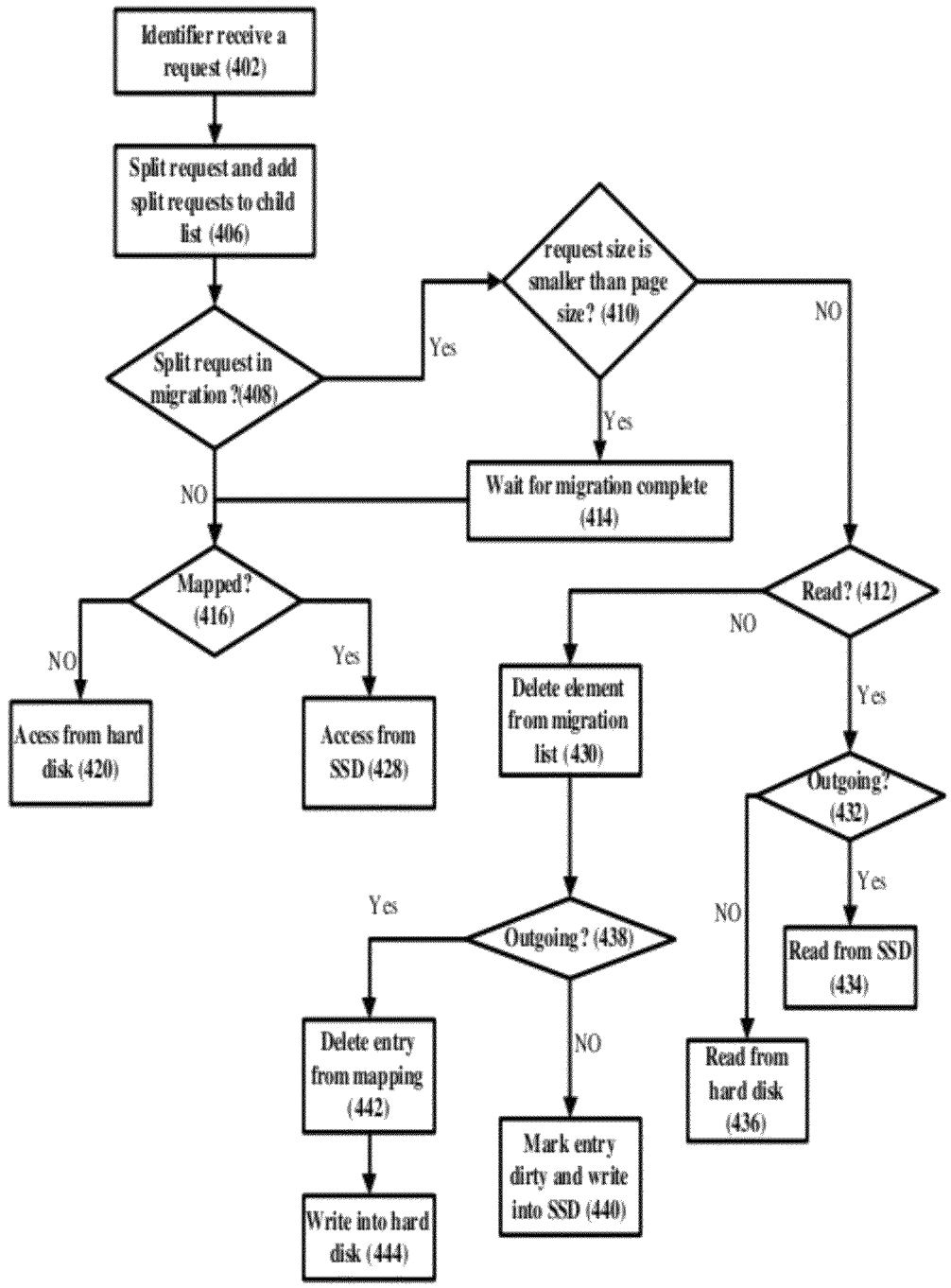
FIG. 4 shows a flowchart of the heterogeneous storage system processing an IO request submitted by the file system.

FIG. 4 shows a flowchart of the heterogeneous storage system processing an IO request submitted by file system 112. At step 402, identifier 116 receives an IO request from an upper level, such as file systems, and begins the process. At step 406, the IO request is split into multiple child requests. All the child requests are added to a dedicated child request list. The splitting process ensures that the size of child requests is equal to or smaller than the page size of the host to simplify the structure of element 200. All child requests are aligned to the first block of the volume. At step 408, dispenser 120 then traverses the child request list. If the block accessed by the child request is in migration, dispenser 120 continues from step 410.

At step 410, dispenser 120 checks if the request size is smaller than the page size of I/O host 102. At step 414, if the child request size is smaller than the file system logic block size, the process waits for completion of migration and then moves to step 416. Thus dispenser 120 prevents data inconsistency by writing partial up-to-date data into either the SSD or the HDD volume. At step 412, if the child request is a write operation, the process jumps to step 430.

At step 432, for a read, if the corresponding block of the child request is in the outgoing list, which are the stale logic blocks being cast out of the SSD, then dispenser 120 reads data from the SSD, step 434. Otherwise, it reads data from the HDD volume, step 436. Since dispenser 120 always reads data from the original address of migration, it ensures that the read operation can return up-to-date data to the upper layer, such as to file system 112.

At step 430, since a write operation over-laps an existing data block on the migration list, dispenser 120 deletes the element whose logic block number in volume 108 is the same as the child request from the migration list. At step 442, if the block accessed is in the outgoing list, step 438, dispenser 120 also deletes the corresponding entry from the mapping and thus frees the space in the SSD by setting status 306 of the entry as NULL. Then dispenser 120 redirects the child request to write to the hard disk at step 444. Otherwise, at step 440, dispenser 120 marks status 306 of the entry as dirty and redirects the child request into the SSD. This process prevents resubmitting the identical IO request and ensures data consistency.

At step 416, the logic block number accessed by the child request is not in the migration list. Dispenser 120 queries if the block is mapped into the SSD based on volume mapping metadata 310. If so, at step 428, the destination of the child request is modified to the block number of the SSD, and dispenser 120 marks the corresponding entry status 306 as dirty if it is a write operation. Otherwise, the operation is submitted to hard disk at step 420.

Figure 5:
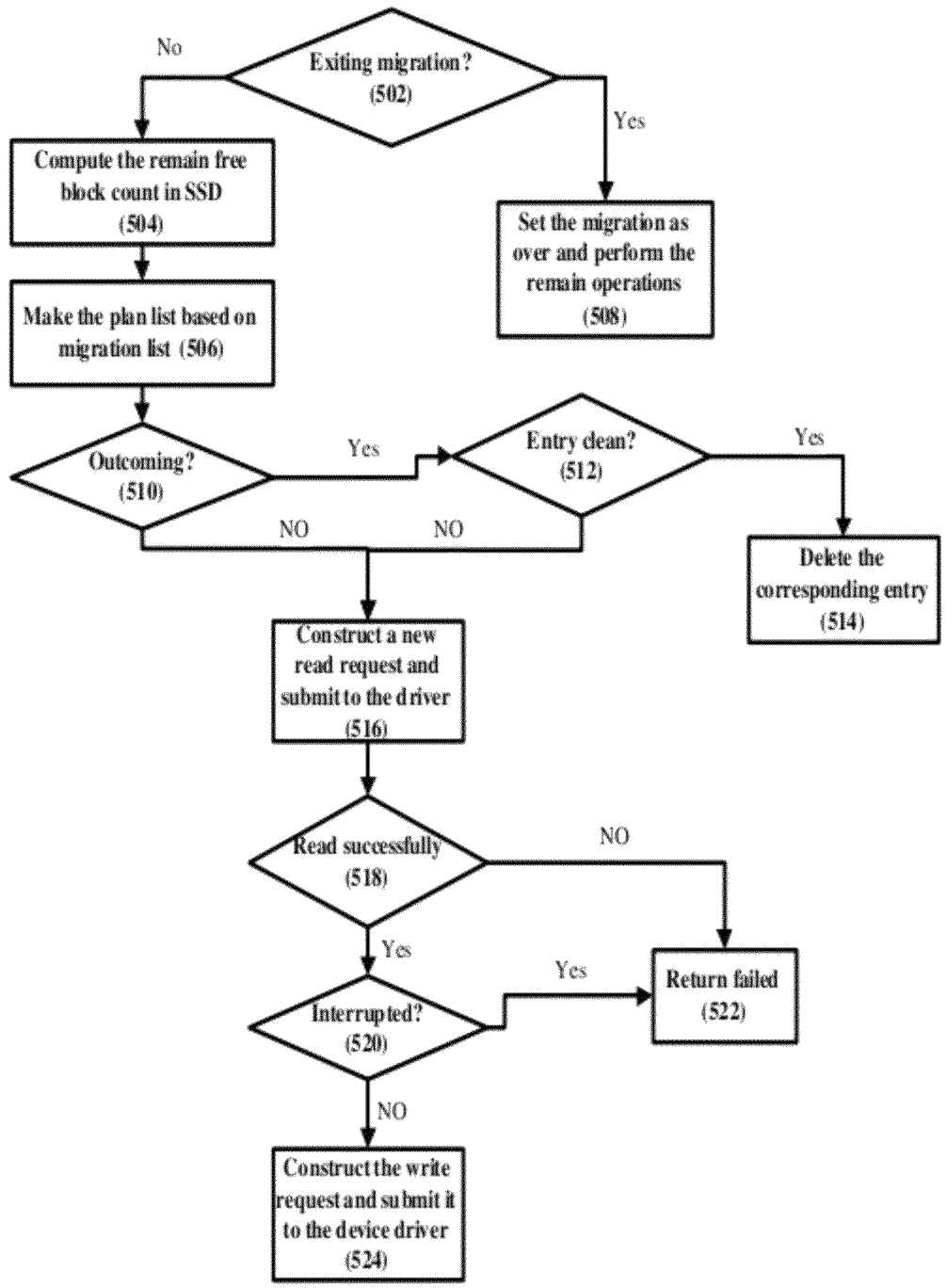
FIG. 5 shows a process of data migration between the SSD and the HDD volumes.

FIG. 5 shows a process of data migration between the SSD and the HDD volumes. This process is typically performed by a dedicated thread or program residing in the operation system in IO host 102. At step 502, migrator 118 first checks if the system is exiting migration, or is completed. If so, at step 508, it sets a tag to represent that migration is over, and then discards any temporary in-memory structures used to complete migration.

Otherwise, migrator 118 computes the free space of the SSD according to the usage of entries in SSD mapping data 300, step 504. The free space is represented as a count of free entries which would be used to migrate hot data from HDD volumes 108 to SSD.

At step 506, before sponsor 122 begins to initiate migration, migrator 118 first configures the migration list, which records the logic blocks to be migrated based on the block current level. To construct the migration list, sponsor 122 traverses top-K B-tree 202 to find out two types of blocks:

(1) Logic blocks which have been mapped in the SSD but have not been included in top-K B-tree 202. Sponsor 122 gets the corresponding block number of these blocks in both SSD and volume 108 to contact list members and then construct the outgoing list.

(2) Logic blocks which have been included in top-K B-tree 202 but have not been mapped in the SSD. Sponsor 122 gets the corresponding block numbers in volume 108 to contact list members and then constructs the incoming list. Sponsor 122 makes the configuration lists based on the two migration lists. The move list combines the members of outgoing and incoming lists.

Migrator 118 traverses the configuration list and processes the members in the list one by one. At step 516, if the current member is a member for migration from volume 108 to the SSD, step 510, then migrator 118 constructs a new read request based on the original volume address and submits it to the hard disk volume driver. To facilitate constructing subsequent write requests, the destination address is saved in the private data of the read request. Therefore, once data is read from original address, the destination address may be determined.

At step 518, if the read request completes successfully, then migrator 118 checks if any interruption occurred in the migration process at step 520. If migrator 118 receives the interruption request (for example, dispenser 120 may remove the members from the migration list at step 430) or the read request fails, migrator 118 completes the operations for this member and consider the next member in the migration list.

At step 524, migrator 118 allocates a free entry from the SSD and adds a new entry into the mapping structure. Then it marks status 306 of the new entry in SSD mapping data 300 as having a clean status, and constructs a new write request based on the read request. To decrease the cost of the data copy operation, the write request reuses the pages allocated in the read request. Finally migrator 118 writes the data into the SSD by submitting the write request to SSD driver 126.

At step 512, the member of the configuration list is for migration from the SSD cache to volume 108. For this type of member, migrator 118 deletes the entry in SSD mapping data 300 corresponding to the logic block if it is clean at step 514. If status 306 of the entry is dirty, step 512, migrator 118 constructs a new read request based on the original SSD address and then submits it to the SSD driver. At step 524, on a successful read, migrator 118 constructs a new write request, and finally submits it to hard disk volume driver 124.

In the process of migration, migrator 118 is able to handle a new IO request from I/O host 102. If I/O host 102 sends a new read request, it accesses the hard disk using dispenser 120. If the logic blocks of the new IO request conflict with the blocks in the migration (being handled by migrator 118), migrator 118 omits the conflicted blocks from its migration list, and writes the remaining data into the destination of the migration.

Having two factors to determine the impact of the current block access, both access frequency and the logarithmic system time, provides for a more balanced caching system. These current factors are accumulated over many time spans to generate the current levels stored in top-K B-tree 202. Blocks that were accessed frequently in the past, but not recently, may still be held in the top-K cache, but other blocks that are being accessed have rising current levels, which eventually surpass the current levels of non-accessed blocks. The logarithmic system time favors more recent accesses, but less strongly than a linear time scale would. A non-zero value is retained for blocks that were accessed frequently in the past. Less thrashing of blocks may result by using two factors rather than just one factor. The accumulation of temporary levels provides a weighting that favors recent accesses, yet does not ignore past accesses.

Alternate Embodiments

Several other embodiments are contemplated by the inventors. For example, software modules may be implemented in hardware, firmware, software, or various combinations. The relative and absolute sizes of the HDD and SSD may vary. A different number of timestamps could be stored in time array 214. The size of the blocks in the SSD may vary with the flash memory technology and organization, or may vary with the design. The SSD blocks may be the smallest erasable unit, or may be multiples of physical erase blocks in the flash memory.

Various programming tools and languages may be used to implement the various software modules. Data structures such as tables can be implemented in a wide variety of ways with many variations, such as trees, sorted tables, databases, etc. Top-K B-tree 202 may have additional dimensions or links to other structures such as element 200, which may have additional fields. Some modules or components could be merged or split.

A variety of non-volatile memory technologies could be employed, such as flash memory, NAND flash, NOR flash, phase-change memory, electrically-erasable programmable read-only memory, electrically-erasable programmable read-only memory, (EEPROM), etc. Capacitors, buffers, resistors, and other components may be added. Various degrees and combinations of integration may be used. Wide or narrow data buses and flash-memory chips could be used, such as 16 or 32-bit data channels, and multiple channels may be provided. The host may be a personal computer, handheld device, server, or a wide variety of other devices and systems.

Directional terms such as upper, lower, up, down, top, bottom, etc. are relative and changeable as the system or data is rotated, flipped over, etc. These terms are useful for describing the device, tables, or structures, but are not intended to be absolutes.

The size if Unit Array 212 can be adjusted to adjust how often the temporary value is computed. When the number of elements in Unit Array 212 is increased, a longer period of time occurs before current levels are recomputed, since Unit Array 212 is filled before the current level is recomputed.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A heterogeneous storage system comprising:
 a primary storage for storing blocks of data, the primary storage having a primary access time;
 a secondary storage for caching blocks of data stored in the primary storage, the secondary storage having a secondary access time that is faster than the primary access time;
 a storage module for managing blocks of data stored in the primary storage and cached in the secondary storage;
 an identifier, in the storage module, for tracking blocks of data stored in the primary storage and cached in the secondary storage;
 a migrator for moving blocks of data between the primary storage and the secondary storage;
 a miss counter for counting accesses from a host for data that is not found in the secondary storage;
 a miss timer for counting time since the migrator was last activated to move blocks of data between the primary storage and the secondary storage;
 a miss trigger, coupled to the miss counter and to the miss timer, triggered when both the miss counter exceeds a miss threshold and the miss timer exceeds a miss time threshold, for activating the migrator to move blocks of data between the primary storage and the secondary storage;
 a dispenser for handling requests from the migrator to access blocks of data in the primary storage and in the secondary storage;
 a mapping table storing physical block numbers of blocks of data stored in the secondary storage and logic block numbers corresponding to the physical block numbers; and
 a top-K tracking table for storing a plurality of K elements, wherein K is a whole number of blocks of data currently able to be stored in the secondary storage;
 wherein the migrator accesses the top-K tracking table to locate blocks of data to remove from the secondary storage having a low current level;
 wherein each element in the plurality of K elements stores a current level, the current level indicating a hotness of data stored in the block of data corresponding to the element;
 wherein the current level is a function of an access frequency and a logarithmic system time,
 whereby blocks of data are chosen for migration out of the secondary storage based on access frequency and the logarithmic system time.

2. The heterogeneous storage system of claim 1 wherein each element in the plurality of elements stored in the top-K tracking table comprise:
 a logic block number indicating a portion of a logical address of a block of data;
 a current level;
 a temporary level; and
 a time array for storing a plurality of time stamps of recent accesses of the block of data identified by the logic block number.

3. The heterogeneous storage system of claim 2 wherein the plurality of K elements in the top-K tracking table are stored in a sorted order.

4. The heterogeneous storage system of claim 3 wherein the plurality of K elements in the top-K tracking table are stored in a sorted order based on the current level of each element.

5. The heterogeneous storage system of claim 4 wherein the top-K tracking table further comprises a row of top pointers, each top pointer pointing to a location of a top element having a highest current level in a column of elements in the top-K tracking table, the top element being in the plurality of elements.

6. The heterogeneous storage system of claim 2 further comprising:
a primary device driver for accessing blocks of data in the primary storage;
a secondary device driver for accessing blocks of data in the secondary storage;
wherein the dispenser submits requests to the primary device driver to access the primary storage, and to the secondary device driver to access the secondary storage.

7. The heterogeneous storage system of claim 2 wherein the primary storage is a Hard Disk Driver (HDD) with spinning platters of magnetic disks;
wherein the secondary storage is a Solid-State-Drive (SSD) storing data in non-volatile memory.

8. The heterogeneous storage system of claim 7 wherein the secondary storage is a flash memory storing data in electrically-erasable programmable read-only memory (EEPROM).

9. A caching hybrid storage subsystem comprising:
a hard-disk-drive (HDD) storage that stores blocks of data on rotating magnetic media;
a solid-state-drive (SSD) storage that stores blocks of data in non-volatile solid-stage memory;
a top-K B-tree for storing current levels for K blocks of data stored on the SSD storage, wherein K is a whole number of blocks of data stored on the SSD storage;
wherein each element in the top-K B-tree stores a current level;
a temporary level generator that generates a temporary level for a block by combining an access frequency of the block with a logarithmic system time;
a current level generator that accumulates the current level for the block by accumulating the temporary level with a prior current level for the block;
a migrator that moves stale blocks of data from the SSD storage to the HDD storage, wherein the stale blocks have lower values of the current level than other blocks of data that remain in the SSD storage; and
an identifier for tracking accesses of blocks of data in the SSD by a host, the identifier storing access information for use by the temporary level generator as the access frequency.

10. The caching hybrid storage subsystem of claim 9 wherein the logarithmic system time is a logarithm of a linear system time that is reset at system initialization.

11. The caching hybrid storage subsystem of claim 9 further comprising:
a time array, stored in each element of the top-K B-tree, the time array storing recent time values when the block of data was accessed by the host, wherein the time array stores R recent time values, wherein R is a whole number,
wherein the access frequency is generated from R divided by a time period that includes all R accesses.

12. The caching hybrid storage subsystem of claim 11 wherein the temporary level generator is activated for an element when R recent values have been stored in the time array for the element;
wherein temporary levels are generated after every R accesses of the block of data.

13. The caching hybrid storage subsystem of claim 12 wherein R is a programmable value that is adjusted by programming to alter caching properties.

14. The caching hybrid storage subsystem of claim 9 further comprising:
a sorter for sorting elements in the top-K B-tree according to current levels, wherein the top-K B-tree is sorted.

15. The caching hybrid storage subsystem of claim 9 further comprising:
a miss counter for counting accesses from a host for data that is not found in the SSD storage;
a miss timer for counting time since the migrator was last activated to move blocks of data between the HDD storage and the SSD storage;
a miss trigger, coupled to the miss counter and to the miss timer, triggered when both the miss counter exceeds a miss threshold and the miss timer exceeds a miss time threshold, for activating the migrator to move blocks of data between the HDD storage and the SSD storage.

* * * * *